United States Patent [19]

Yoshimaru et al.

[11] Patent Number: 4,755,980
[45] Date of Patent: Jul. 5, 1988

[54] OPTICAL DISK AND RECORDING/REPRODUCING DEVICE FOR OPTICAL DISK

[75] Inventors: Tomohisa Yoshimaru, Yokohama; Akihiko Doi, Tokyo; Tetsuo Saito, Yokohama, all of Japan

[73] Assignee: Kabushiki Kaisha Toshiba, Kawasaki, Japan

[21] Appl. No.: 829,954

[22] Filed: Feb. 18, 1986

[30] Foreign Application Priority Data

Feb. 19, 1985 [JP] Japan .................. 60-31013
Mar. 18, 1985 [JP] Japan .................. 60-53738
May 10, 1985 [JP] Japan .................. 60-99031

[51] Int. Cl.$^4$ .................. G11B 7/00; G11B 27/36
[52] U.S. Cl. .................. 369/54; 369/45; 369/58; 369/116
[58] Field of Search .................. 369/44–48, 369/50, 53, 54, 58, 116, 41; 346/76 L

[56] References Cited

U.S. PATENT DOCUMENTS

| 4,286,318 | 8/1981 | Immink et al. | 369/45 |
| 4,527,263 | 7/1985 | Nakagawa | 369/46 |
| 4,611,317 | 9/1986 | Takeuchi et al. | 369/45 |
| 4,630,252 | 12/1986 | Miura et al. | 369/44 |

FOREIGN PATENT DOCUMENTS

| 126682 | 11/1984 | European Pat. Off. | 369/54 |
| 152165 | 8/1985 | European Pat. Off. | 369/54 |
| 113137 | 9/1980 | Japan | 369/54 |
| 2132388 | 7/1984 | United Kingdom | 369/54 |

Primary Examiner—Donald McElheny, Jr.
Attorney, Agent, or Firm—Finnegan, Henderson Farabow, Garrett and Dunner

[57] ABSTRACT

In a device for recording or reproducing information by using a light beam, there is provided an optical disk comprising a base plate, a recording layer formed on the base plate, tracks provided for recording information on the recording layer, and a focus check area for checking if the light beam is focused at the optimum position on the recording layer when an optical head which generates the light beam faces the recording layer. Accordingly, it is possible to change the focus position for the recording layer of the optical disk by the objective lens of the optical head during recording and reproducing information. Also, it is possible to set it at a position where the bit error rate is smallest and has a wider margin for the shaft of the adjust position.

8 Claims, 9 Drawing Sheets

OPTICAL DISK AND RECORDING/REPRODUCING DEVICE FOR OPTICAL DISK

BACKGROUND OF THE INVENTION

1. Field of the Invention

The present invention relates to an optical disk on which information is recorded and reproduced by focused light and a recording/reproducing device for recording or reproducing information for the optical disk.

2. Discussion of Background

In recent years, an image information filing device has been used in which image information such as documents to be produced in large quantities are photoelectrically-converted by means of two-dimensional scanning, and the photoelectrically-converted image information is recorded or retrieved and reproduced so that it can be output as hard copies.

In such a recording/reproducing device that has conventionally been used, an optical disk is used for recording information spirally and the information is recorded and reproduced by an optical head which moves straight to radius direction of the optical disk by a linear motor.

However, in the record reproducing device in which an optical disk is used, as described above, a beam may not be irradiated to a proper position due to mounting error when performing focusing of an objective lens at an optical head. Therefore, it is necessary to correct the position of focus by applying a bias voltage (offset voltage) when amplifying the detection signal for focusing.

However, the above correction is merely performed by means of setting of the optimum adjust position at mounting (at delivery), that is, however, when the bit error rate is produced by actual operation, the optimum adjust position is different and the bit error rate is increased. Also, the margin for variation of optical disks or deviation of optical axis due to change of external environment, or displacement of the photodetector is narrow. Further, for the above correction, no problem arises when the optium adjust position is set where the bit error rate is smallest and is the same for recording and for reproducing information. However, in reality, the optimum adjust position at recording and the optimum adjust position at reproducing are different due to astigmatism which a semiconductor laser oscillator has, or change of injection direction of laser light by output power, and the problem as described above has arisen.

Further, an optical disk in an optical disk recording-/reproducing device is different in nature depending on the kind of materials which manufacturers use. Organic or inorganic materials may be used as the material of the recording layer of an optical disk. For an optical disk where inorganic materials are used, there are two types, pit forming type and phase transition type, or bubble forming type. For an optical disk where organic materials are used, there are two types, pit forming type and molecular structure changing type. These various recording layers are different in the reflection factor of light depending on the difference of the method of producing a recording layer or materials. Also, there are layers where the reflection factor of light is different, that is, layers where the reflection factor of light at the recording unit for the recorded signals is high and layers where the reflection factor is low. Or, the threshold value of the power of light source used for irradiation of a light is different depending on the difference of recording layers. Therefore, conventionally, it is impossible to perform recording or reproducing by the same optical disk recording/reproducing device by means of an optical disk where the nature of a recording layer is different from other layers.

SUMMARY OF THE INVENTION

The present invention is made based on above circumstances and an object thereof is to provide an optical disk in which it is possible to correct the focus position of an optical head, make the bit error rate smaller, and have a wide margin for shift of the adjust position.

Another object of the present invention is to provide a recording/reproducing device for an optical disk in which it is possible to correct the focus position for the recording layer by the objective lens of an optical head, make the bit error rate smaller, and have a wide margin for shift of the adjust position.

Yet another object of the present invention is to provide an optical disk recording/reproducing device where it is possible to perform recording or reproducing of information for an optical disk of different nature.

For achieving the above objects, in a device for recording/reproducing information by using focus light, the present invention provides an optical disk comprising a base plate, a recording layer formed on the base plate, a track provided for recording information on the recording layer, and a focus check area where a data for checking if the focused light is focused at the optimum position on the recording layer when an optical head generating a focus light faced the recording layer is recorded. Further, for achieving the above objects, in a device for recording/reproducing information for the optical disk by using focus light, the present invention provides a light source, converging means for focusing the light generated from the light source on the focus check area of the optical disk, changing means for changing the focus position on the focus check area by the converging means, judgement means for judging the various bit error rates at the focus position, which were changed by the converging means, memorizing means for memorizing various bit error rates obtained by the judgment means, inferring means for inferring the optimum focus position by the bit error rate memorized by the memorizing means, and setting means for setting the converging means at the focus position corresponding to the result of judgment of the inferring means.

DETAILED DESCRIPTION OF PREFERRED EMBODIMENT

Figure 1:
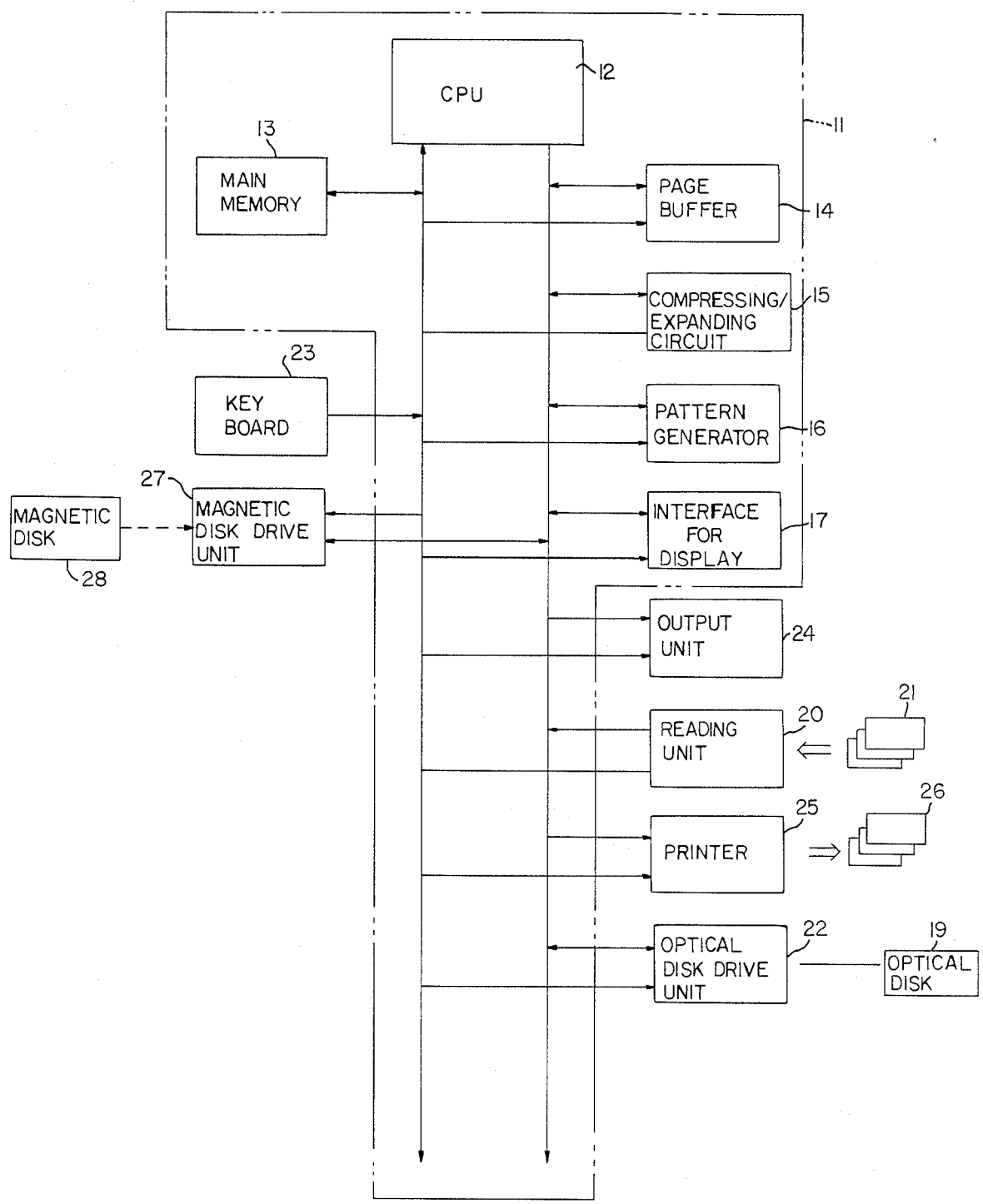
FIG. 1 is a block diagram showing the construction of an image information storing/retrieving device having an optical disk and an optical disk recording/reproducing device according to the present invention.

Referring now to the drawings, an embodiment of the present invention is described below.

FIG. 1 shows an imaqe information storing/retrieving device in which an optical disk and a recording/reproducing device for the optical disk of the present invention are used. A main control unit 11 includes a CPU 12 for performing various controls, a main memory 13, a page buffer 14, a compressing/expanding circuit 15 for compressing (reducing redundancy) and for expanding (returning the reduced redundancy to the original degree) an image information, a pattern generator 16 in which pattern information such as letters or symbols are stored, and an interface 17 for display. A reading unit 20 includes for example, a two dimensional scanning unit and a unit for obtaining electric signals corresponding to the image information on the documents 21 by two-dimensional scanning using laser light on documents 21. An optical disk drive unit 22 is a unit in which the image information read by reading unit 20 is supplied through main control unit 11 and the image information is recorded successively on an optical disk 19.

Figure 2:
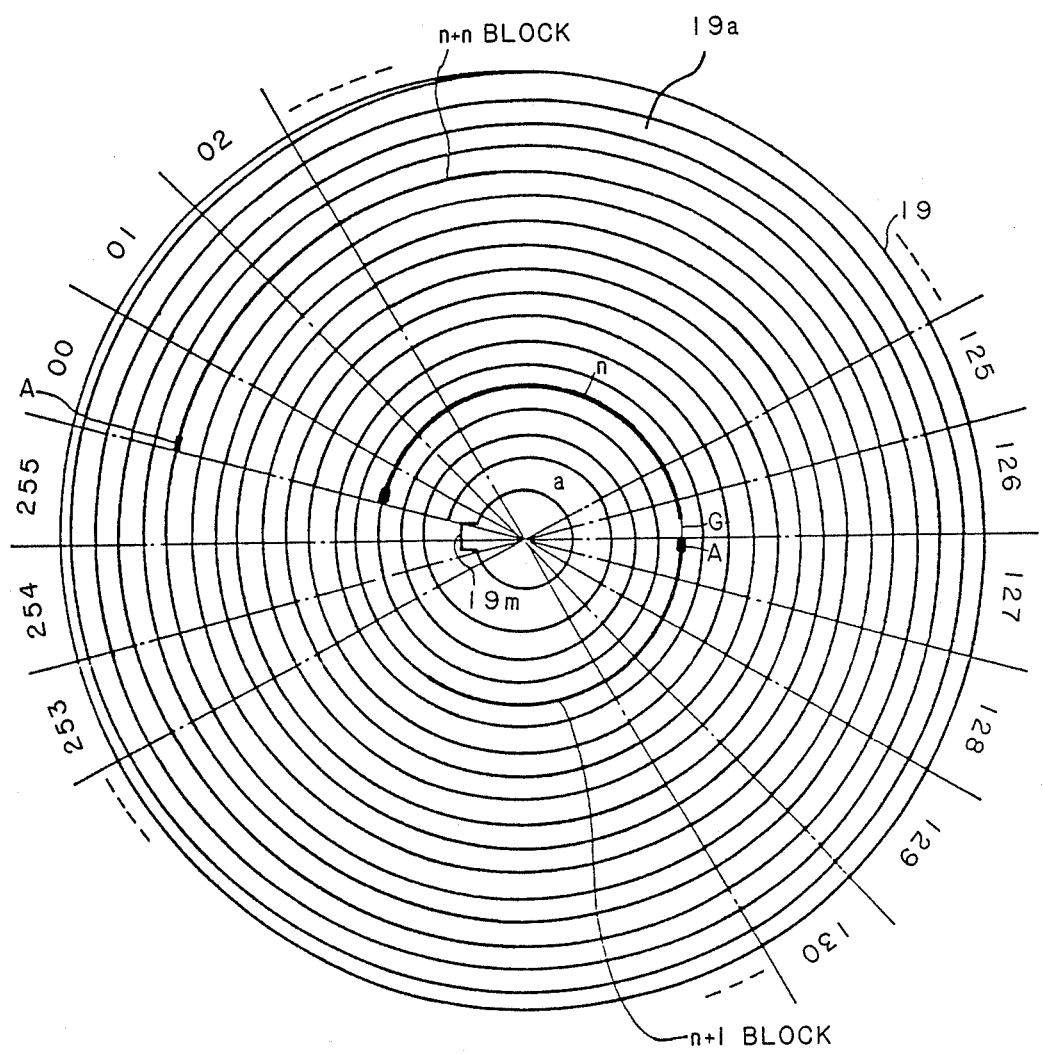
FIG. 2 is a plan view showing the construction of an optical disk of the present invention.

As shown in FIG. 2, optical disk 19 includes a circular base plate such as glass or plastic and a recording layer 19a of tellurium or bismuth, that is, a metallic film layer is coated on its surface in doughnut shape. In the vicinity of the center of the metallic film layer, a reference position mark 19m is formed in a cut shape without a coating of metallic film layer. Also, the surface of optical disk 19 is divided into 256 sectors of "0-255" taking the reference position mark 19m as "0".

On optical disk 19, information (image information) of variable length is recorded over a plurality of blocks and the information of 300,000 blocks is recorded in 36,000 tracks on optical disk 19. Also, the number of the sectors of one block on optical disk 19 is 40 on the inner side and 20 on the outer side. Further, when each block is not ended at a switch position, a block gap G is provided so that each block always starts from the switch position of the sectors, as shown by the n block and the n+1 block. On the start position of the blocks, a block header (preheader) A comprising block number and track number is recorded at the time of manufacture of the optical disk 19.

Further, on optical disk 19, a focus check area a is provided where a data for checking the focus state is previously recorded on the innermost periphery and includes a data where errors are liable to be generated, that is, a data where the optimum focus position is easily presumed. For example, a random data, a data to be changed by the smallest pitch bit (2 pitch) in a 2-7 conversion code, or a data to be changed by the largest pitch bit (7 pitch) in a 2-7 conversion code is recorded. The focus check area a includes a plurality of tracks.

As shown in FIG. 1, a key board 23 is provided for inputting a particular retrieval code corresponding to image information and various operation instructions. An output unit 24 includes cathode-ray tube display units which are used as a display section. The output unit 24 displays the image information to be read by reading unit 20 and supplied through main control unit 11 or the image information to be read from optical disk drive unit 22 and supplied through main control unit 11. Output unit 24 is combined with interface 17 for display of main control unit 11 to constitute a large image information display device. A printer 25 is a unit for outputting the image information to be read by reading unit 20 and supplied through main control unit 11 or the image information read from optical disk unit 22 and supplied through main control unit 11 as a hard copy 26. A magnetic disk drive unit 27 is a unit for memorizing the retrieval code input from a key board 23 and the retrieval data comprising the size of one image information corresponding to this retrieval code and for driving the disk to the memory address on optical disk 19 where each image information is stored on a magnetic disk 28. The retrival data includes retrieval code (image title) comprising a plurality of retrieval keys, the image store leading block number, and the number (image length) of image memory blocks.

Figure 3:
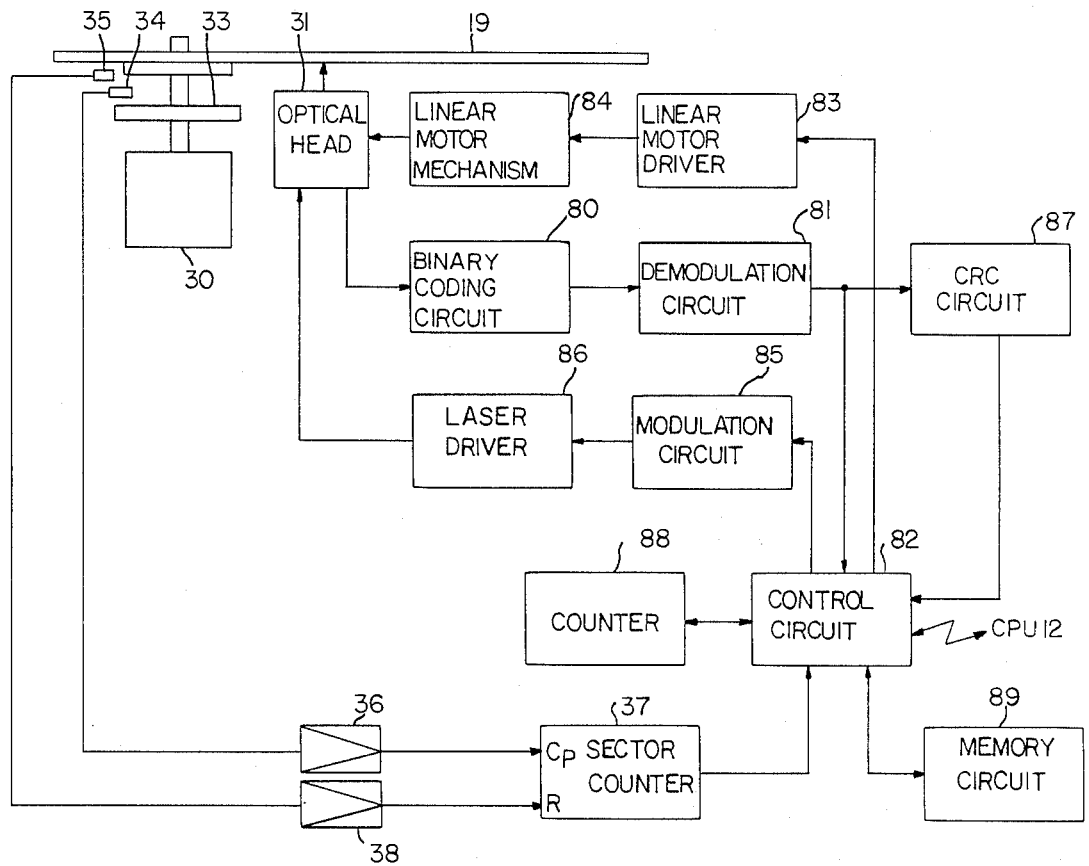
FIGS. 3 and 4 are schematic illustrations of an optical disk recording/reproducing device of the present invention.
Figure 4:
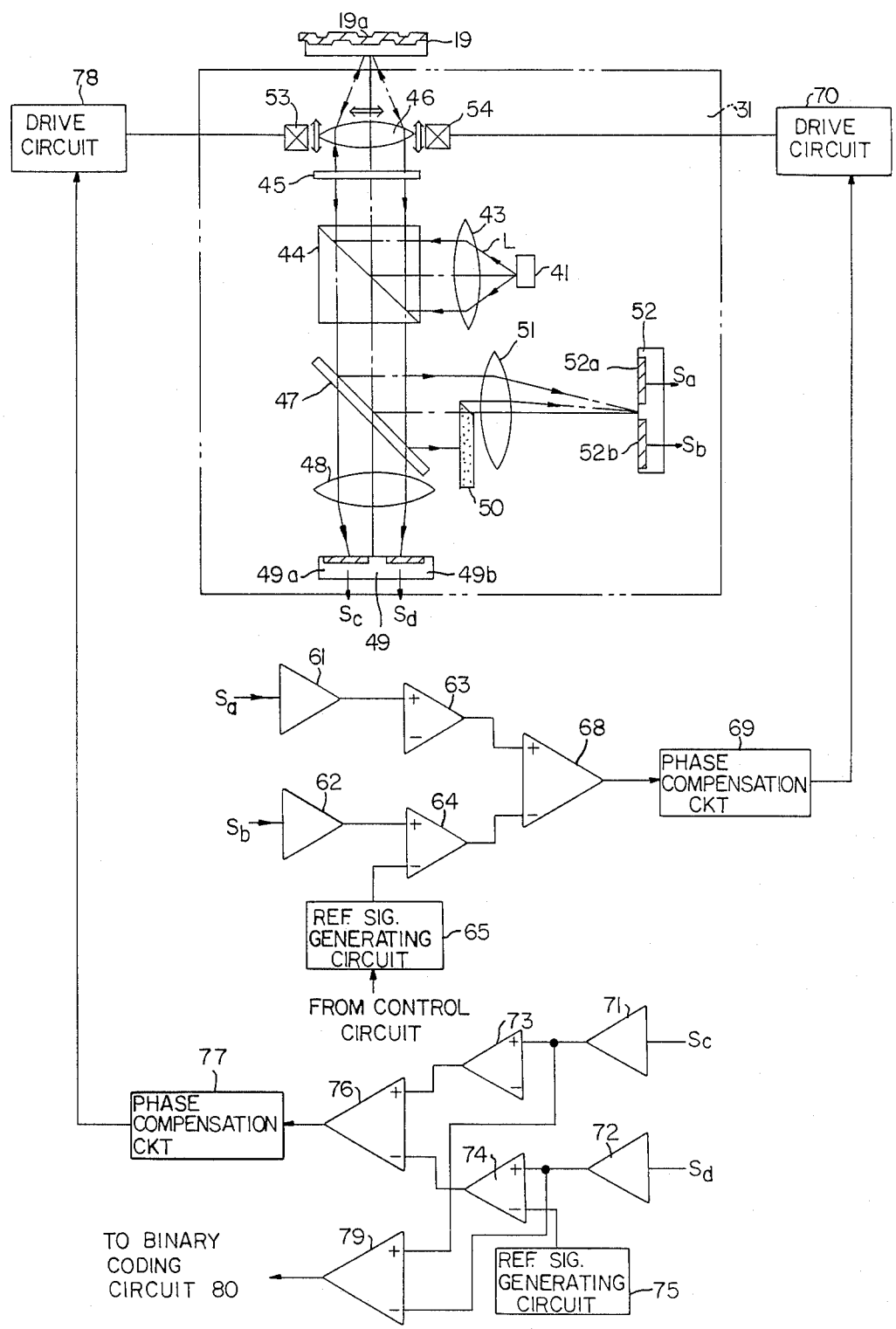

Next, referring to FIGS. 3 and 4, the construction of the essential parts of optical disk unit 22 is described. Optical disk 19 is rotated by a motor 30 so that the linear velocity is constant to an optical head 31. A disk 33, where a mark for generating signals is provided at a fixed interval, is attached to a rotary shaft 32 of motor 30. The mark on disk 33 is optically detected by a detector 34 comprising a light-emitting diode and a light-receiving element. Under optical disk 19, a detector 35 is provided comprising a light-emitting diode and a light-receiving element for optically detecting the reference position mark 19m. The output of the detector 34 is supplied to the clock pulse input terminal CP of a sector counter 37 through an amplifier 36 and the output of detector 35 is supplied to the reset input terminal R of sector counter 37 through an amplifier 38.

Optical head 31 for recording and reproducing information is provided on the lower side of optical disk 19. Optical head 31 is constructed as follows as shown in FIG. 4. Divergent laser light L is generated from a semiconductor laser 41 to be used for a light source. In this case, when writing (recording) information on recording layer 19a of optical disk 19, laser light is generated where the light intensity is modulated in accordance with the information to be written. When reading (reproducing) information from recording layer 19a of optical disk 19, laser light L is generated having a fixed light intensity smaller in power than that in recording. The divergent laser light L generated from the semiconductor laser 41 is converted into a parallel light beam by a collimating lens 43 and is led to a polarized beam splitter 44. The laser light L, from the polarized beam splitter 44, then passes a quarter-wave plate 45 and is focused to recording layer 19a of optical disk 19 by an objective lens 46. Objective lens 46 is movably supported in the direction of the optical axis and in the direction rectangular to the optical axis. Accordingly, when objective lens 46 is positioned at a fixed position, the beam waste of the focusing laser light L passed through objective lens 46 is injected on the surface of recording layer 19a and the minimum beam spot is formed on the surface of recording layer 19a. In this state, objective lens 46 is held in the focusing state and in the tracking state to allow writing and reading of information.

The divergent laser light L is reflected from recording layer 19a of optical disk 19, is converted into a parallel light beam by objective lens 46, passes through quarter-wave plate 45 again, and is returned to polarized beam splitter 44. By passing the laser light L through quarter-wave plate 45 twice, the plane of polarization of the laser light L is rotated 90° when compared with that of the laser light L obtained when reflected by polarized beam splitter 44. Therefore, the laser light L where the plane of polarization is rotated 90° pass polarized beam splitter 44 without being reflected by polarized beam splitter 44. The laser light L passed through polarized beam splitter 44 is divided into 2 systems by a half mirror 47 and the laser beams L of a tracking error detection system are irradiated on a first photodetector 49 by a first projection lens 48. The first photodetector 49 includes photosensing cells 49a and 49b for converting the light formed in an image by first projection lens 48 into electric signal. A detecting signal Sc and a detecting signal Sd are outputted from these photosensing cells 49a and 49b, respectively.

The laser light L of the laser light L of a detection system, after the component is passed through the half mirror 47, is shielded by a knife edge a light-shielding plate 50, and passes a second pro3ection lens 51 and then is irradiated on a second photodetector 52. The second photodetector 52 includes photosensing cells 52a and 52b for converting the light formed in an image by the second projection lens 51 into an electric signal. A detecting signal Sa and a detecting signal Sb are outputted from photosensing cells 52a and 52b, respectively.

The output of optical head 31, that is, the output of each photosensing cell 49a, 49b, 52a and 52b, is outputted to amplifiers 61, 62, 71 and 72. The ouput of amplifier 61 is supplied to a nonreversible input terminal "+" of a differential amplifier 68 as a subtracting circuit through an amplifier 63. The output of an amplifier 62 is supplied to the nonreversible input terminal "+" of a differential amplifier 64, and a bias voltage (offset voltage) is supplied from a reference signal qenerating circuit 65 to the reversible input terminal "−" of differential amplifier 64.

Reference signal generating circuit 65 is a circuit for outputting a bias voltage (analog signal) as various reference signals in accordance with a signal (digital signal) to be supplied from a control circuit 82. This reference signal generating circuit 65 is a circuit for outputting a bias voltage as a reference signal so that the beam spot is positioned at the optimum position by objective lens 46 at recording and reproducing. Further, reference signal generating circuit 65 ouputs a bias voltage for moving the beam spot by objective lens 46 at detecting the bit error rate. Reference signal generating circuit 65 outputs a bias voltage of, for example, −10 volts to +10 volts according to the signal supplied from control circuit 82.

The output of the differential amplifier 64 is supplied to the reversible input terminal of "−" of a differential amplifer 68. Therefore, the differential amplifier 68 outputs the signal in accordance with a focusing error by taking the difference between the detecting signal Sa from photosensing cell 52a and the signal where an offset voltage is added to the detecting signal Sb of photosensing cell 52b. The output of differential amplifier 68 is shaped by a phase compensation circuit 69 and is supplied to a drive circuit 70. Drive circuit 70 is a circuit for drivinq objective lens 46 by supplying the current to a coil 54 for driving objective lens 46 in a vertical direction with reference to recording layer 19a of optical disk 19.

The output of an amplifier 71 is supplied to the nonreversible input terminal "+" of a differential amplifier 76 as a subtraction circuit through an amplifier 73. The output of an amplifier 72 is supplied to the nonreversible input terminal "+" a differential amplifier 74 and the bias voltage (offset voltage) is supplied from a reference signal generating circuit 75. Reference signal generating circuit 75 is a circuit for outputting a bias voltage as a reference signal so that the beam spot is positioned at the optimum position by the objective lens 46 at recording and reproducing and the voltage thereof is set for the unit.

The output of differential amplifier 74 is supplied to the reversible input terminal "−" of differential amplifier 76. Therefore, differential amplifier 76 outputs the signal in accordance with a tracking error at normal tracking by taking the difference between the detecting signal Sc by photosensing cell 49a and the signal where the offset voltage from reference signal generating circuit 75 is added to the detecting signal Sd from photosensing cell 49b. The output of differential amplifier 76 is shaped by a phase compensation circuit 77 and is supplied to a drive circuit 78. Drive circuit 78 is a circuit for driving objective lens 46 by supplying current to a coil 53 for driving the objective lens 46 in horizontal direction with reference to recording layer 19a of optical disk 19.

The output of amplifier 71 and the output of amplifier 72 are supplied to an adder circuit 79. Adder circuit 79 is a circuit for outputting the result where these signals are added to a binary coding circuit 80 (to be described later) as a reading signal.

The output of optical head 31, that is, the output of adder circuit 79 is supplied to binary coding circuit 80. The binary-coded signal output by binary coding circuit 80 is demodulated b a demodulation circuit 81, as shown in FIG. 3, supplied to a control circuit 82 and supplied to a CRC (cyclic redundancy check) circuit 87. Control circuit 82 is a circuit for controlling a whole device in accordance with the signal from the external unit, that is, CPU 12. Control circuit 82 is a circuit for calculating the track number and the start sector number which are accessed in accordance with the conversion table memorized in a conversion table section (not shown in the drawings) when, for example, a block number for recording and reproducing is supplied. Further, control circuit 82 converts the track number into a scale value when a track number is calculated and drives and controls a linear motor driver 83 until the scale value coincides with the position detected by the output of a position detector (not shown in the drawings). Linear motor driver 83 is a driver for moving optical head 31 by control of control circuit 82 through a linear motor mechanism 84 so that the beam of optical head 31 irradiates a fixed track. Linear motor mechanism 84 is a mechanism for starting, recording and reproducing operations for optical head 31 when optical head 31 faces the object track at the above access position and when the start coincides with the count value of a start sector counter 37.

Further, control circuit 82 converts the data from paqe buffer 14 by a modulation circuit 85 and supplies it to a laser driver 86. Modulation circuit 85 is a circuit for modulating the recording data supplied from control circuit 82. Laser driver 86 is a driver for recording data by driving semiconductor laser 41 in optical head 31 in accordance with the supplied modulation signal.

CRC circuit 87 is a circuit for performing a cyclic redundancy check by using 16 byte data and a CRC code. The result of the checking performed by CRC circuit 87 is supplied to a counter 88 through control circuit 82. Control circuit 82 calculates the number of errors to be supplied. Counter 88 causes a memory circuit 89 to memorize the number of counts (bit error rate) to be supplied from counter 88 for each track and every bias voltage.

Next, the operation of the circuit of the above construction is described. First, when setting optical disk 19 on optical disk drive unit 22, CPU 12 determines a bit error rate in a checking mode and outputs the checked signal to control circuit 82. By this output, control circuit 82 calculates the start track number and the start sector of the focus check area by using the conversion table section (not shown in the drawings). By this start track number, control circuit 82 converts the track number into a scale value and causes linear motor driver 83 to drive until the scale and the position detected by the output of the position detector (not shown in the drawings) coincide. Next, control circuit 82 starts reproduction of a data for the focus check area a when the count value of sector counter 37 and above start sector coincide. In this case, control circuit 82 outputs a signal to make the bias voltage generated from the reference signal generating circuit 65 to reference signal generating circuit 65 equal to zero.

In such a state as described above, a divergent laser light beam (reproduced light L) of weak luminous intensity generated from semiconductor laser 41 is converted into a parallel light beam by collimating lens 43 and is guided to polarized beam splitter 44. The laser beam L guided to polarized beam splitter 44 is reflected by polarized beam splitter 44, injected in the objective lens 46 through quarter-wave plate 45 and focused to recording layer 19a of optical disk 19 by objective lens 46. In this state, the reflected light from optical disk 19 to the reproduced beam is converted into a parallel light beam by objective lens 46, passes quarter-wave plate 45 again and is returned to polarized beam splitter 44. By passing laser light L through quarter-wave plate 45 twice, the plane of polarization of the laser light L is rotated 90° when compared with that of the laser light L obtained when the light L is reflected by polarized beam splitter 44. The laser light L where the plane of polarization is rotated 90° passes polarized beam splitter 44 without being reflected by polarized beam splitter 44. The laser light L passed polarized beam splitter 44 is divided into 2 systems by half mirror 47 and the laser light L of tracking error detection system is irradiated on first photodetector 49 by first projection lens 48. The laser light L of the focusing error detection system, after the component passes through the area apart from the optical axis and is shielded by knife edge (light-shielding plate) 50, passes second projection lens 51 and then is irradiated on second photodetector 52. Accordingly, the signals corresponding to the irradiated lights from photosensing cells 52a, 52b, 49a, and 49b are output and these signals are supplied to amplifiers 61, 62, 71 and 72, respectively.

As the result, the signal from amplifier 61 is amplified by amplifier 63 and supplied to differential amplifier 68. The output from amplifier 62 is supplied to differential amplifier 64. At this time, reference signal generating circuit 65 supplies "0" Volt bias voltage to differential amplifier 64. By this, differential amplifier 64 outputs the signal where the bias voltage (0 V) is added to the signal supplied from amplifer 62 to differential amplifier 68. Therefore, differential amplifier 68 outputs the signal to be obtained by taking the difference between the detection signal Sa from photosensing cell 52a and the signal where the bias voltage (0 V) is added to the detection signal Sb from photosensinq cell 52b to drive circuit 70 through phase compensation circuit 69. By this, drive circuit 70 supplies a fixed current to coil 54 in accordance with the signal from phase compensation circuit 69 and drives objective lens 46 in a vertical direction to move the focus position.

In such a state as described above, the outputs of amplifier 71 and 72 are added by adder circuit 79 and supplied to binary coding circuit 80. Then, the binary coded data output by binary coding circuit 80 is demodulated by demodulation circuit 81 and supplied to control circuit 82 and CRC circuit 87. As a result, when control circuit 82 judges the preheader of the corresponding track, it calculates the check result of CRC circuit 87 for the data read after the header by counter 88. When the data for one track is checked, control circuit 82 memorizes the contents of counter 88 as the number of errors for bias (0 V) in memory circuit 89 and clears counter 88.

Next, control circuit 82 outputs the signal so that the bias voltage generated from reference signal generating circuit 65 becomes +1 volt for reference signal generating circuit 65. By this procedure, the signal supplied to differential amplifier 63 is amplified and supplied to differential amplifier 68. Also, the output from amplifier 62 is supplied to differential amplifier 64. As a result, differential amplifier 64 outputs the signals where the bias voltage (+1 V) is added to the siqnal supplied from amplifier 62 to differential amplifier 68. Therefore, differential amplifier 68 outputs the signal obtained by taking the difference between the detection signal Sa from photosensing cell 52a and the signal where a bias voltage (+1 V) is added to the detection signal Sb from photosensing cell 52b to drive circuit 70 through phase compensation circuit 69. Drive circuit 70 supplies a fixed current to coil 54 in accordance with the signal from phase compensation circuit 69 and drives objective lens 46 in a vertical direction to move the focus position.

In the above state, the output of amplifier 71 and of amplifier 72 are added by adder circuit 79 and supplied to binary coding circuit 80. Then, the binary coded data output by binary coding circuit 80 is demodulated by demodulation circuit 81. By this procedure, when control circuit 82 judges the preheader of the corresponding track, it calculates the check result by CRC circuit 87 for the data read after the header by counter 88. When the data for one track is checked, control circuit 82 memorizes the contents of counter 88 as the number of errors for bias "+1 V" in memory circuit 89 and clears counter 88.

Further, control circuit 82 outputs successively a signal made by adding 1 volt to each bias voltage generated from reference signal generating circuit 65 to reference signal generating circuit 65, obtains the number of errors for respective bias voltage "+1 V"—"+nV", and stores it in memory circuit 89.

Figure 5:
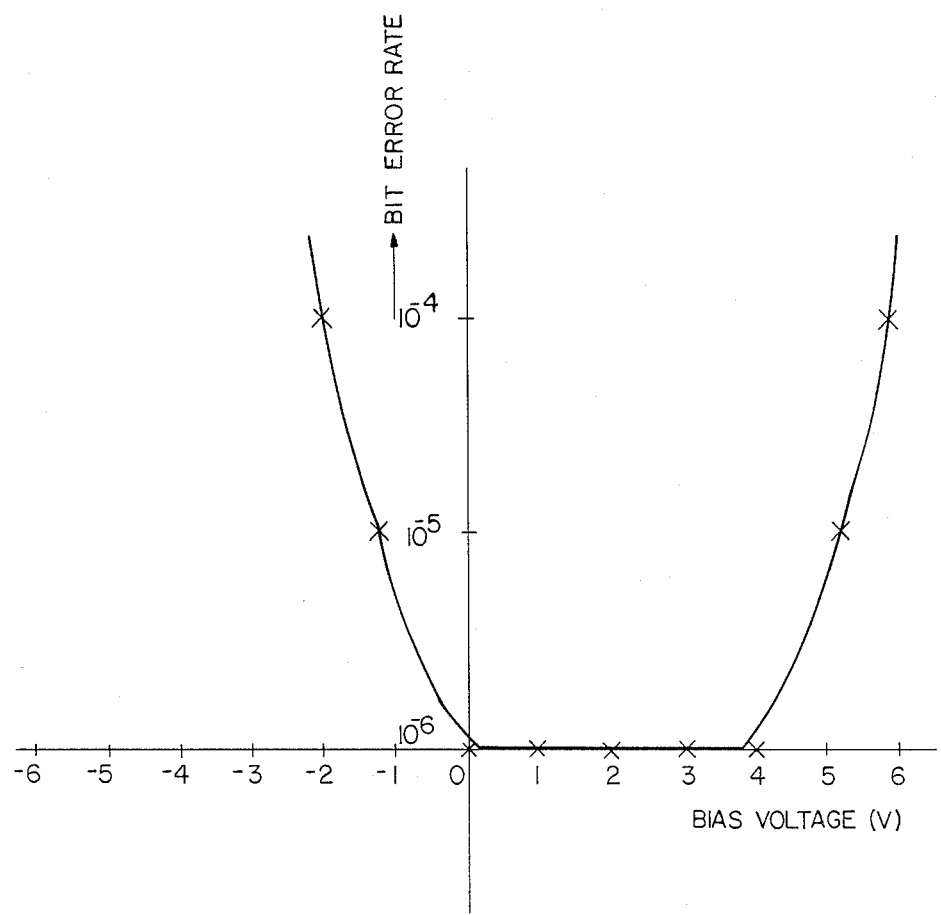
FIG. 5 is a graphic diagram showing the relation between the bias voltage and the error rate.

When the preheader shows a bias voltage which cannot be read due to tracking error and focus abnormality, control circuit 82 obtains the optimum bias voltage of the number of errors (bit error rate) for each bias voltage stored in memory circuit 89 and outputs the signal corresponding to the obtained bias voltage to reference signal generating circuit 65. For example, as shown in FIG. 5, when the bit error rate of $10^{-4}$ at $-2$ V and $+6$ V bias voltage, the bit error rate of $10^{-5}$ at $-1$ V and $+5$ V bias voltage, and the bit error rate of $10^{-6}$ at 0 V $- -+4$ V bias voltage are obtained, the optimum bias voltage is judged to be $+2$ V. For this reason, it is preferable that $+2$ V bias voltage is generated from reference signal generating circuit 65. Accordingly, it is possible to set objective lens 46 at the best focus position and also provide a wide margin of error due to the shift of mounting position.

The recording of data when the objective lens is set at the optimum focus position is finished in such a manner as described above. For example, assume that a block number for recording (accessing) from CPU 12 of main control unit 11 to control circuit 82 is used to calculate the track number and the start sector for the object block by using a conversion table unit (not shown in the drawings). From this track number, control circuit 82 converts the track number into a scale value and drives linear motor driver 83 until the scale value coincides with the position detected by the output of a position detector (not shown in the drawings). Next, when the count value of sector counter 37 coincides with above start sector, control circuit 82 starts the recording of data for optical disk 19. At this time, the recording data from control circuit 82 is moduluated by modulation circuit 85 and supplied to laser driver 86. As a result, laser driver 86 records the data by driving semiconductor laser 41 in optical head 31 in accordance with the supplied modulation signal.

Next, the reproducing operation is described. For example, assume a block number for reproducing (accessing) from CPU 12 of main control unit 11. Control circuit 82 calculates the track number and the start sector for the object block by using a conversion table (not shown in the drawings). By this track number, control circuit 82 converts the track number into a scale value and drives linear motor driver 83 until the scale value coincides with the position detected by the output of a position detector (not shown in the drawings). Next, when the count value of sector counter 37 coincides with above start sector, control circuit 82 starts reproduction of the data for optical disk 19. At this time, the read signal of optical head 31 is supplied to binary coding circuit 80 and the binary-coded signal by binary coding circuit 80 is supplied to demodulation circuit 81. Demodulation circuit 81 demodulates the signal supplied from binary coding circuit 80 and outputs the demodulated reproducing data to control circuit 82. Control circuit 82 outputs the reproducing data to page buffer 14 in main control unit 11.

The divergent laser light L generated from semiconductor laser 41 is converted into a parallel light flux by collimating lens 43 and guided to polarized beam splitter 44. The laser light L guided to polarized beam splitter 44 is reflected by polarized beam splitter 44, injected in objective lens 46 through quarter-wave plate 45 and focused to recording layer 19a of optical disk 19 by objective lens 46. When recording information in this state, a bit is formed on the track on optical disk 19 by irradiating a laser light beam (recording beam) of strong luminous intensity. When performing operations, except for irradiation of recording beam and reproduction of information, a laser light flux (reproducing beam) of weak luminous intensity is irradiated. The reflected light from optical disk 19 for the reproduced beam is converted into a parallel light flux by objective lens 46, passes quarter-wave plate 45 again, and is returned to polarized beam splitter 44. By passing the laser light L through quarter-wave plate 45 twice, the plane of polarization of the laser light L is rotated 90° when compared with that of the laser beam L obtained when the beam L passed polarized beam splitter 44. The laser light L where the plane of polarization is rotated 90° passes polarized beam splitter 44 without being relected by polarized beam splitter 44. The laser beam L reflected by polarized beam splitter 44 is divided into 2 systems by half mirror 47 and the laser beam L of a tracking error detection system is irradiated on first photodetector 49 by first projection lens 48. The laser beam L of a focusing error detection system, after the component passes the area apart from the optical axis is shielded by a knife edge of light-shielding plate 50, passes a second projection lens 51 and then is irradiated on second photodetector 52. Accordingly, the signals corresponding to the irradiated light from photosensing cells 52a, 52b, 49a and 49b are output and these signals are supplied to amplifiers 61, 62, 71 and 72 respectively. As a result, the outputs of amplifiers 71 and 72 are added by adder circuit 79 and the added results are supplied to binary coding circuit 80 as read signals (reproducing signals).

A focusing operation for recording and reproducing information in above state is now described. The signal from amplifier 62 is amplified by amplifier 63 and supplied to differential amplifier 68. The output from amplifier 62 is supplied to differential amplifier 64. At this time, the signal obtained in the above bit error rate check mode is supplied from control circuit 82 to reference signal generating circuit 65. For this purpose, reference signal generating circuit 65 supplies, for example, a $+2$ V bias voltage as a reference signal to differential amplifier 64. As a result, differential amplifier 64 outputs the signal where the bias voltage is added to a signal supplied from amplifier 62 to differential amplifier 68. Therefore, differential amplifier 68 outputs the signal corresponding to the focusing error obtained by taking the difference between the detection signal Sa from photosensing cell 52a and the signal where a bias voltage (offset voltage) is added to the detection signal Sb from photosensing cell 52b to drive circuit 70 through phase compensation circuit 69. Drive circuit 70 supplies a fixed current to coil 54 in accordance with the signal from phase compensation circuit 69 and drives objective lens 46 in a vertical direction to perform focusing at recording. As a result, it is possible to position the beam spot by objective lens 64 at recording at the optimum position by correcting it using the bias voltage even if a shift of the position of objective lens 46 occurs.

As described above, it is possible to change the focus position for the recording layer of the optical disk by the objective lens of the optical head into the optimum adjust position at recording and reproducing information and also to set it at the position where the bit error rate is smallest. Accordingly, it is possible to provide a wide margin for the shift of the adjust position.

Figure 6:
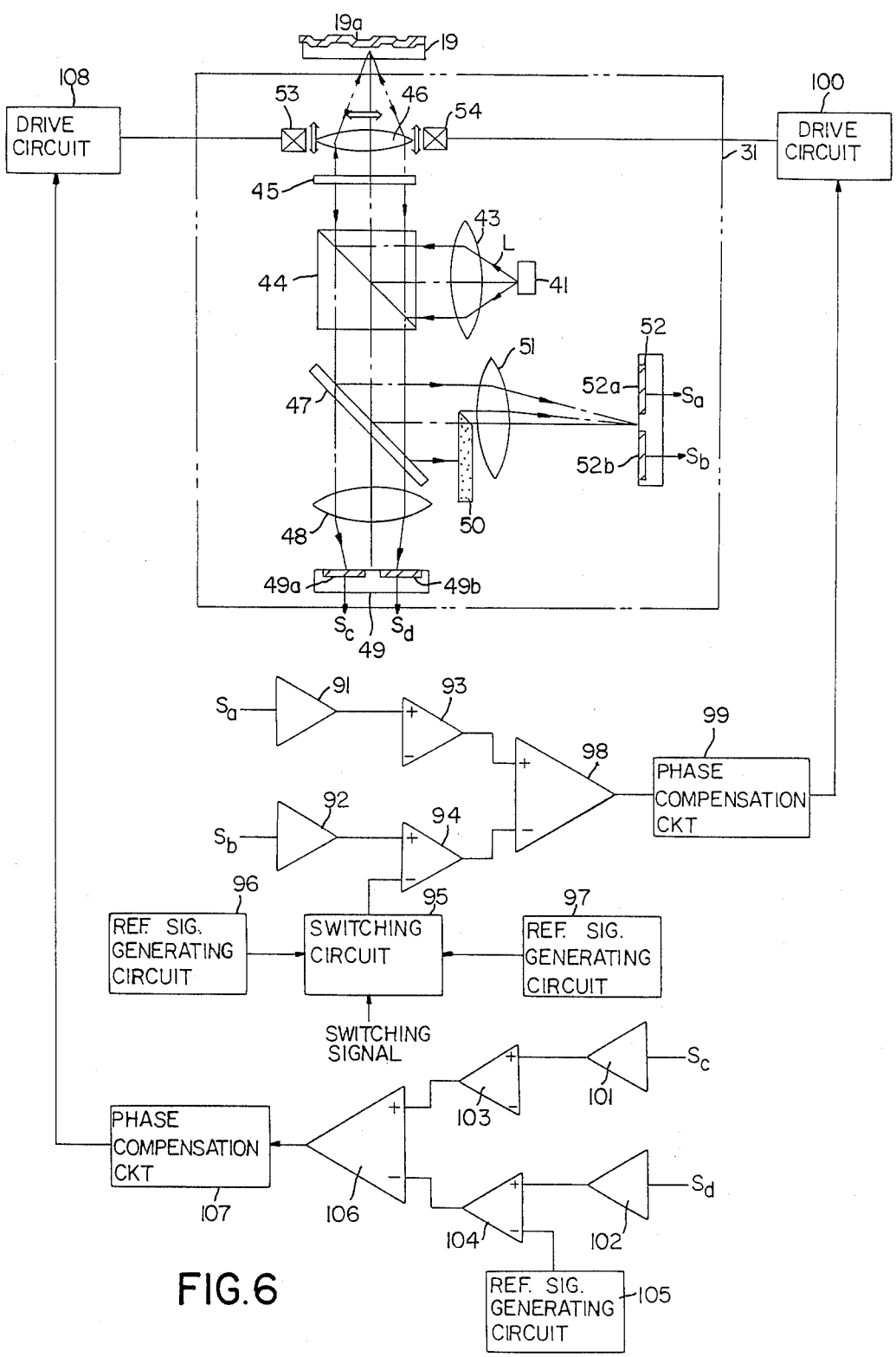
FIG. 6 is a schematic illustration of an optical disk recording/reproducing device showing another embodiment of the present invention.

Next, another embodiment of the present invention, which is shown in FIG. 6, is described. The output of optical head 31, that is, the output of each photosensing cell 49a, 49b, 52a, and 52b, is supplied to amplifiers 91, 92, 101 and 102, respectively. The output of amplifier 91 is supplied to the nonreversible input terminal "+" of a differential amplifier 98 as a subtraction circuit through an amplifier 93. Also, the output of an amplifier 92 is supplied to the nonreversible input terminal "+" of a differential amplifier 94 and a bias voltage (offset voltage) is supplifed from a switching circuit 95 to the reversible input terminal "−" of differential amplifier 94. Switching circuit 95 is a circuit for outputting a bias voltage as a reference signal supplied from a reference signal generating circuit 96 or a reference signal generating circuit 97 in accordance with a switch signal supplied from a control circuit (not shown in the drawing). For a switch signal to be supplied from the control circuit, a different signal for reproducing and recording is supplied. Reference signal generating circuit 96 is a circuit for outputting a bias voltage as a reference signal so that the beam spot by objective lens 46 is positioned at the optimum position at recording and reference signal generating circuit 97 is a circuit for outputting a bias voltage as a reference signal so that the beam spot by objective lens 46 is positioned at the optimum position at reproducing. These voltage values are set at the time of manufacture of each unit.

The output of differential amplifier 94 is supplied to the reversible input terminal "−" of differential amplifier 98. As a result, differential amplifier 98 outputs the signal corresponding to the focusing error by taking the difference between the detection signal Sa from the photosensing cell 52a and the signal where an offset voltage is added to the detection signal Sb from the photosensing cell 52b. The output of the differential amplifier 98 is shaped by a phase compensation circuit 99 and supplied to a drive circuit 100. Drive circuit 100 is a circuit for driving objective lens 46 by supplying a current to coil 54 for driving objective lens 46 in a vertical direction with reference to recording layer 19a of optical disk 19.

The output of an amplifier 101 is supplied to the nonreversible input terminal "+" of a differential amplifier 106 as a subtraction circuit through an amplifier 103. Also, the ouptut of an amplifier 102 is supplied to the nonreversible input terminal "+" of a differential amplifier 104 and a bias voltage (offset voltage) from a reference signal generating circuit 105 is supplied to the reversible input terminal "−" of differential amplifier 104. Reference signal generating circuit 105 is a circuit for outputting a bias voltage as a reference signal so that the beam spot by objective lens 46 is positioned at the optimum position at recording and reproducing and the voltage value thereof is set at the time of manufacture of the unit.

The output of differential amplifier 104 is supplied to the reversible input terminal "−" of a differential amplifier 106. As a result, differential amplifier 106 outputs a signal corresponding to the tracking error at usual tracking by taking the difference between the detection signal Sc from photosensing cell 49a and a signal where the offset voltage from reference signal generating circuit 105 is added to the detection signal Sd from photosensing cell 49b. The output of differential amplifier 106 is shaped by a phase compensation circuit 107 and supplied to a drive circuit 108. Drive circuit 108 is a circuit for driving objective lens 46 by supplying a current corresponding to coil 53 for driving objective lens 46 in a horizontal direction with respect to recording layer 19a of optical disk 19.

Next, the operation of the above construction will be described. As shown in FIG. 6, a divergent laser light L generated from semiconductor laser 41 is converted into a parallel liqht flux by collimating lens 43 and guided to polarized beam splitter 44. The laser light L, guided to polarized beam splitter 44, is reflected by polarized beam splitter 44 and then passes quarter-wave plate 45 and is injected into objective lens 46 and is focused into recording layer 19a of optical disk 19 by objective lens 46. When recording information in the above state, a pit is formed on the track on optical disk 19 by irradiation of a laser light flux (recording beam light) of strong luminous intensity and when reproducing information, a laser light flux (reproducing beam light) of weak luminous intensity is irradiated. The reflected light from optical disk 19 for the reproducing light beam is converted into a parallel light flux by objective lens 46, again passes through quarter-wave plate 45, and is returned to polarized beam splitter 44. By passing through quarter-wave plate 45 twice, the plane of polarization of the laser light L is rotated 90° when compared with that of the laser light L obtained when the light L is reflected by polarized beam splitter 44. The laser light L where the plane of polarization is rotated 90° passes polarized beam splitter 44 without being reflected by polarized beam splitter 44. The laser light L, passed through polarized beam splitter 44, is divided into 2 systems by half mirror 47 and the laser light L of a tracking error detection system is irradiated on first photodetector 49 by first projection lens 48. The laser light L of a focusing error detection system, after the component only passes the area apart from the optical axis, is shielded by a knife edge of light-shielding plate 50, passes second projection lens 51 and then is irradiated on the second photodetector 52. Accordingly, the signals corresponding to the irradiated lights from photosensing cells 52a, 52b, 49a, and 49b are output and these signals are supplied to amplifiers 91, 92, 101 and 102 respectively.

The focusing operation during the recording of information in the above state is described below. The signal from amplifier 91 is amplified by amplifier 93 and supplied to differential amplifier 98. The output from amplifier 92 is supplied to differential amplifier 94. At this time, a switch signal for recording is supplied from a control circuit (not shown in the drawing) to switching circuit 95. For this purpose, switching circuit 95 supplies a bias voltage as a reference signal from reference signal generating circuit 96 to differential amplifier 94. As a result, differential amplifier 94 outputs the signal where a bias voltage is added to the signal supplied from amplifier 92 to differential amplifier 98. Accordingly, differential amplifier 98 outputs the signal corresponding to the focusing error to be obtained by taking the difference between the detection signal Sa from photosensing cell 52a and the signal where a bias voltage (offset voltage) is added to the detection signal Sb from photosensing cell 52b to drive circuit 100 through phase compensation circuit 99. By this operation, drive circuit 100 supplies a fixed current to the coil 54 in accordance with the signal from phase compensation circuit 99 and drives objective lens 46 in a vertical direction to perform focusing at recording. As a result, it is possible to position the beam spot by objective lens 46 at recording at the optimum position by correcting it by the above bias voltage even if a shift of the position of objective lens 46 occurs.

Next, the focusing operation during the reproduction of information will be described. The signal from amplifier 91 is amplified by amplifier 93 and supplied to differential amplifier 98. The output from amplifier 92 is supplied to differential amplifier 94. At this time, a switch signal for reproducing is supplied from the control circuit (not shown in the drawing) to switching circuit 95. For this purpose, switching circuit 95 supplies a bias voltage as a reference signal from reference signal generating circuit 97 to differential amplifier 94. As a result, differential amplifier 94 outputs a signal where a bias voltage is added to the signal supplied from amplifier 92 to differential amplifier 98. Accordingly, differential amplifier 98 outputs a signal corresponding to the focusing error to be obtained by taking the difference between the detection signal Sa from photosensing cell 52a and a signal where a bias voltage (offset voltage) is added to the detection signal Sb from the photosensing cell 52b to drive circuit 100 through phase compensation circuit 99. By this operation, drive circuit 100 supplies a fixed current in accordance with the signal from phase compensation circuit 99 to coil 54 and drives objective lens 46 in vertical direction to perform focusing during reproducing. As a result, it is possible to position the beam spot by objective lens 46 during reproducing at the optimum position by correcting it by using the above bias voltage even if a shift of the position of objective lens 46 occurs.

Next, the tracking operation will be described. The output from the amplifier 101 is amplified by amplifier 103 and supplied to differential amplifier 106. The output from amplifier 102 is supplied to differential amplifier 104. At this time, a bias voltage as a reference signal from reference signal generating circuit 105 is supplied to differential amplifier 104. By this operation, differential amplifier 104 outputs a signal where a bias voltage is added to the signal supplied from amplifier 102 to differential amplifier 106. Accordingly, differential amplifier 106 outputs a signal obtained by taking the difference between the detection signal Sc from photosensing cell 49a and a signal where the bias voltage (offset voltage) from the reference signal generating circuit 105 is added to the detection signal Sd from photosensing cell 49b to drive circuit 108 through phase compensation circuit 107. By this operation, drive circuit 108 supplies a fixed current to coil 53 in accordance with the signal from phase compensation circuit 107 and drives objective lens 46 in a horizontal direction to perform tracking.

As described above, it is possible to change the focus position of objective lens 46 during recording and reproducing information to the optimum adjust position for each operation. Also, it is possible to set the focus position at the position where the bit error rate is smallest and also provide a wider margin for the shift of the adjust position.

Figure 7:
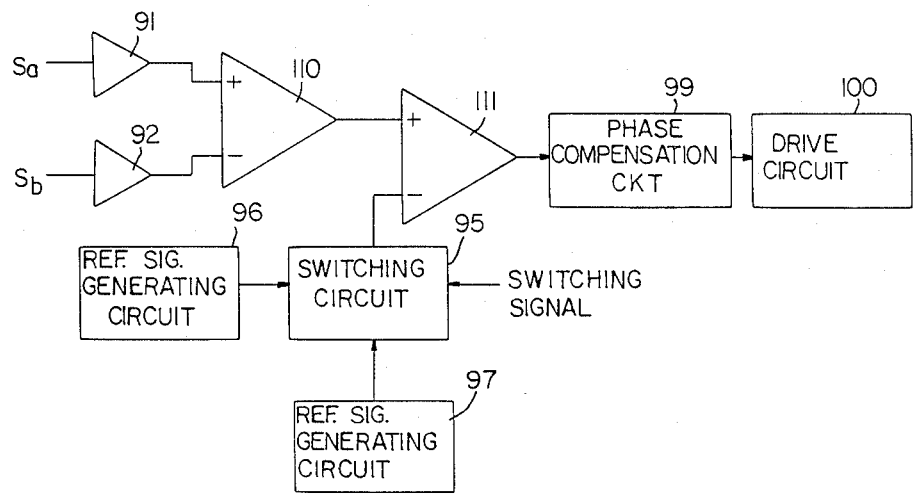
FIGS. 7 and 8 are block diagrams of an optical disk recording/reproducing device showing other embodiments of the present invention.

In the above embodiment, the case where an offset voltage is added to one of the detection signals from two photosensing cells was described. However, the device of the present invention is not always limited to that use. The device may also be constructed as shown in FIG. 7. Here, after taking the difference of the detection signals from two photosensing cells by a differential amplifier 110, an offset voltage supplied from the switching circuit 95 may be applied by a differential amplifier 111.

Figure 8:
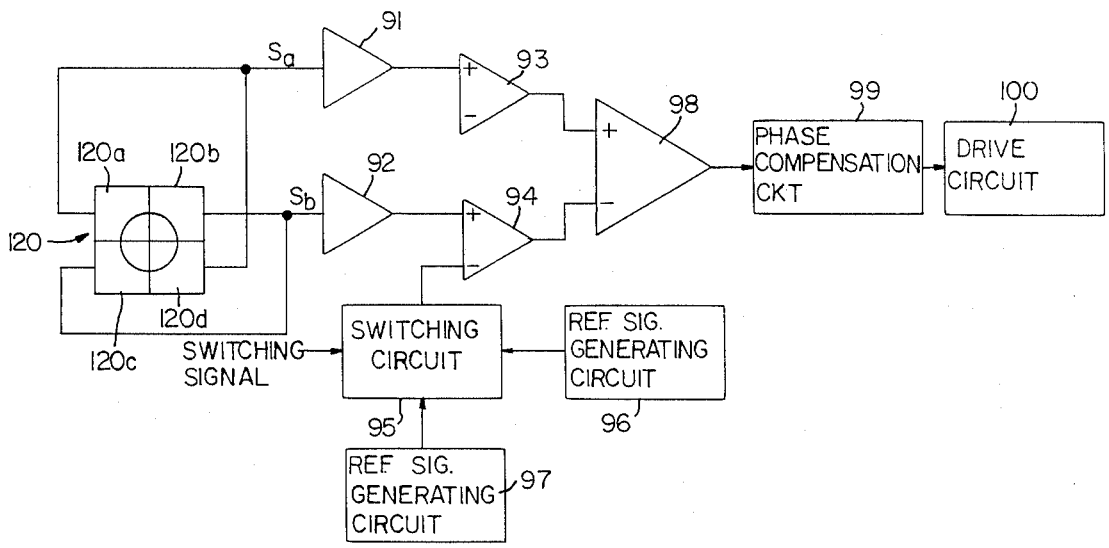

Also, in this embodiment, the case where a photodetector is comprised of two photosensing cells has been described. However, the device of the present invention is not limited to that embodiment. The device may also be constructed as shown in FIG. 8. Here, a detection by astigmatism method is performed by using four photosensing cells 120a, 120b, 120c and 120d as a photodetector 120. In this case, the signals obtained by added the detection signals from photosensing cells 120a and 120d are used as a detection signal Sa and this detection signal Sa is supplied to amplifier 91 and the signals obtained by adding the detection signals from photosensing cells 120b and 120c are used as a detection signal Sb and this detection signal Sb is supplied to amplifier 92.

Figure 9:
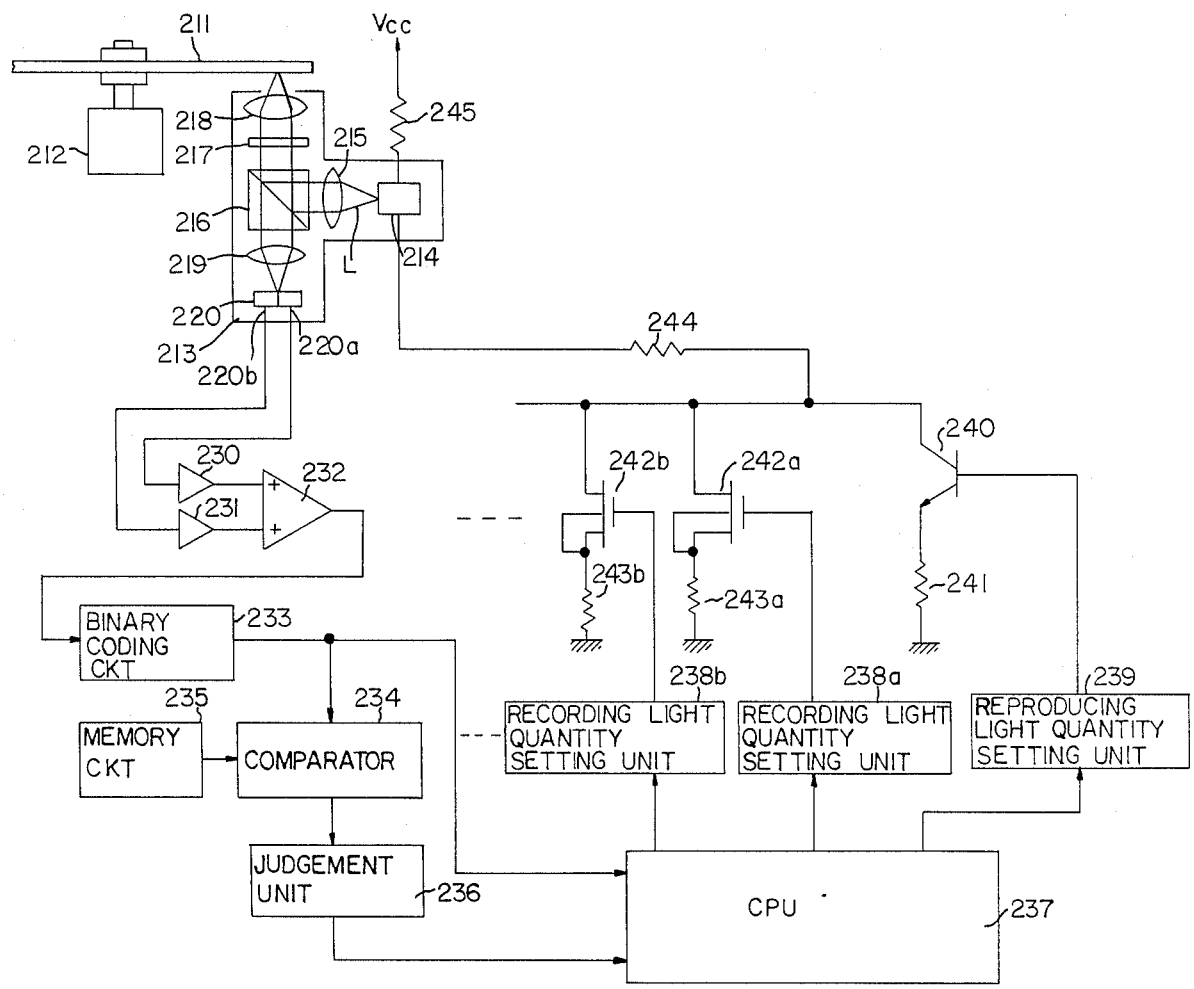
FIG. 9 is a schematic illustration of an optical disk recording/reproducing device showing other embodiments of the present invention.
Figure 10:
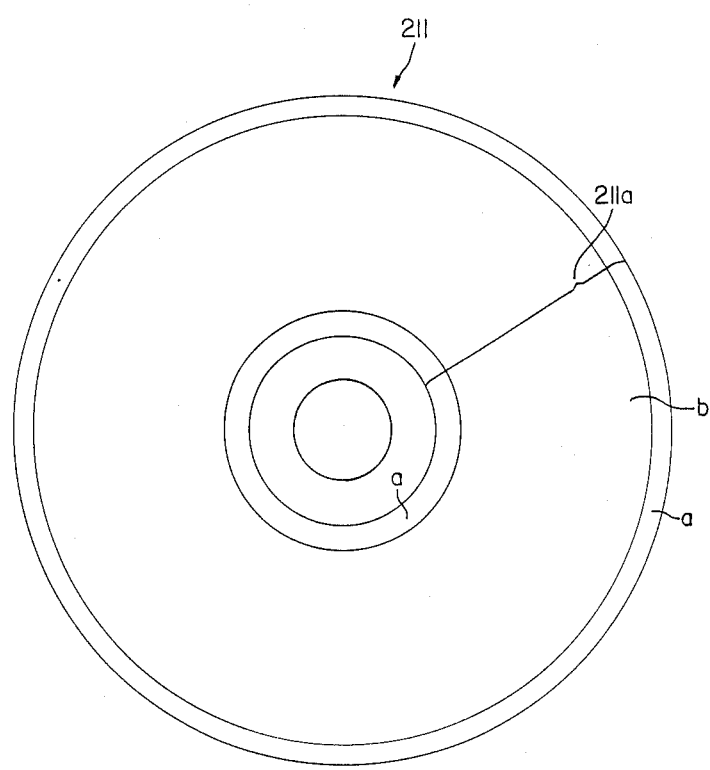
FIG. 10 is a plan view showing the construction of an optical disk to be used for an optical disk recording/reproducing device shown in FIG. 9.

Further, referring to FIGS. 9 and 10, other embodiments of the present invention are described.

An optical disk 211 is rotated by a motor 212 at a constant linear velocity for an optical head 213. As shown in FIG. 10, optical disk 211 has a glass or plastic circular base plate and a surface coated with a metal layer, such as tellurium or bismuth, that is, a recording layer 211a in doughnut shape. Also, at the innermost periphery and the outermost periphery of the recording layer 211a of optical disk 211, there is provided nonrecording area a where no track is formed and at a recording area b, other than nonrecording area a, there are spirally formed a plurality of recording tracks by pregroove. The method of forming a layer and the materials at nonrecording area a and forming recording area b are quite the same. As a result, the kind of the optical disk can be judged by detecting the reflection factor for nonrecording area a.

On the lower side of optical disk 211, optical head 213 for recording and reproducing information is provided. Optical head 213 is constructed as follows. Divergent laser light beam L is generated from a semiconductor laser 214 to be used for a light source. In this case, when writing (recording) information on recording layer 211a of optical disk 211, the light intensity of laser light beam L is modulated and generated in accordance with the information to be written. When reading (reproducing) information from recording layer 211a of optical disk 211, laser light L, having a fixed light intensity smaller in power than that in recording, is generated. The divergent laser light L generated from the semiconductor laser 214, is converted into a parallel light beam by a collimating lens 215 and is led to a polarized beam splitter 216 and then passes a quarter-wave plate 217 and is focused to recording layer 211a of optical disk 211 by an objective lens 218. Objective lens 218 is movably supported in the direction of optical axis and in the direction rectangular to the optical axis. Accordingly, when objective lens 218 is positioned at a fixed position, the beam waste of the focusing laser light L passed through objective lens 218 is injected onto the surface of recording layer 211a and the minimum beam spot is formed on the surface of recording layer 211a. In this state, objective lens 218 is held at a position equal to the focusing state and in the tracking state to allow writing and reading of information.

The divergent laser light L, reflected from recording layer 211a of optical disk 211, is converted into a parallel light beam by objective lens 218, passes through quarter-wave plate 217 again, and is returned to polarized beam splitter 216. By passing the laser light L through quarter-wave plate 217 twice, the plane of polarization of the laser light L is rotated 90° when compared with that of the laser light L obtained when reflected by polarized beam splitter 216. Therefore, the laser light L where the plane of polarization is rotated 90° passes polarized beam splitter 216 without being reflected by polarized beam splitter 216.

The laser light L, passed through polarized beam splitter 216, is irradiated on a photodetector 220 through a projection lens 219. Photodetector 220 includes photosensing cells 220a and 220b for converting the light to be imaged by projection lens 219 into an electric signal.

The output of optical head 213, that is, the outputs of photosensing cells 220a and 220b are supplied to amplifiers 230 and 231 respectively. The outputs of amplifiers 230 and 231 are supplied to an adder 232. Adder 232 is a unit for outputting the result obtained by adding the signals supplied from amplifiers 230 and 231 to a binary-coding circuit 233. The binary-coded signal output by binary-coding circuit 233 shows the reading reflection factor and is supplied to a comparator 234 and a CPU 237.

Comparator 234 is a unit for comparing the reading reflection factor supplied from binary-coding circuit 233 with the various reference values stored in a memory circuit 235. As a result of this comparison, a signal is output corresponding to a signal showing in which area the reading reflection factor is present, that is, a signal showing the type of optical disk. Memory circuit 235 is a circuit where the reflection factors for the recording layer of various optical disks is stored as a reference value. Memory circuit 235 includes, for example, a ROM. The output of comparator 234 is supplied to a judgment unit 236. Judgment unit 236 is a unit for outputting nature information (K1-Kn) corresponding to a signal supplied from judgment unit 234, that is, a signal showing the type of optical disk to CPU 234. The nature information is a value of the oscillation output of a semiconductor laser 214 at recording or reproducing for each optical disk. For example, laser beam power for writing 10 mW and laser beam power for reproducing 1 mW is output for nature information K1 and laser beam power for writing 5 mW and laser beam power for reproducing 0.5 mW for the nature information K2.

CPU 237 is a unit for controlling the whole unit and for outputting a control signal of light quantity corresponding to that used during recording and reproducing in accordance with the nature information supplied from judgment unit 236 to recording light quantity setting units 238a and 238b and a reproducing light quantity setting unit 239. Reproducing light quantity setting unit 239 is a unit for outputting a drive signal to the base of a NPN transistor 240 in accordance with the control signal supplied from CPU 237 at reproducing. The emitter of transistor 240 is grounded through a resistor 241. Transistor 240 amplifies a current at an amplification factor corresponding to a drive signal supplied from reproducing light quantity setting unit 239. As a result, a different current flows through semiconductor laser 214 due to the difference between the current amplification of transistor 240 and the change in light quantity of reproducing light beam by semiconductor laser 214 in accordance with the kind of optical disk 211.

Also, recording light quantity setting units 238a and 238b are the units for outputting ON/OFF control signals to the gates of Field Effect Transistors (FETs) 242a and 242b, which correspond to the modulation signals of the recording data in accordance with the control signal supplied from CPU 237 during recording. The sources of these FETs 242a and 242b are grounded through resistors 243a and 243b which are different in the resistance values. The drains of FETs 242a and 242b and the collector of transistor 240 are connected through a resistor 244, semiconductor laser 214, and a resistor 245, respectively, to the power source Vcc.

FETs 242a and 242b are turned ON in accordance with the control signals supplied from recording light quantity setting units 238a and 238b and the current flow through resistors 243a and 243b in semiconductor laser 214. As a result, a different current flows in semiconductor laser 214 due to the difference of FETs 242a and 242b when turned ON and the change in light quantity of the recording light beam by semiconductor laser 214 in accordance with the kind of the optical disk 211.

Next, the operation of the above construction will be described. First, an optical disk 211 of a fixed kind is set on the recording/reproducing device, and CPU 237 drives motor 212 to cause optical disk 211 to be rotated. Next, CPU 237 makes optical head 213 correspond to the nonrecording area a at the innermost periphery or the outermost periphery of optical disk 211. Then, CPU 237 outputs a drive signal in accordance with a fixed reproducing signal to the base of transistor 240, and transistor 240 amplifies the current at the amplification factor in accordance with the drive signal. By this operation, a laser light beam (reproducing light beam) L of weak luminous intensity is generated from semiconductor laser 214. As a result, the laser light beam L from semiconductor laser 214 is focused in parallel by collimating lens 215 and is guided to polarized beam splitter 216. The light beam L guided to polarized beam splitter 216 is reflected, injected onto objective lens 218, and is focused by objective lens 218 on nonrecording area a of recording layer 211a of optical disk 211. The reflected light from optical disk 211 is converted into a parallel light beam by objective lens 218, and guided to polarized beam splitter 216 through quarter-wave plate 217. At this time, the light beam guided to polarized beam splitter 216 passes through and returns through quarter-wave plate 217, and the plane of polarization is rotated 90° when compared with that of the light reflected by polarized beam splitter 216. Therefore, the laser light beam passes without being reflected by polarized beam splitter 216. The laser light beam L passed through polarized beam splitter 216 is irradiated on photodetector 220 through projection lens 219. Accordingly, the signals corresponding to the irradiated light from photosensing cells 220a and 220b are output and these signals are supplied to amplifiers 230 and 231, respectively.

The signals from amplifiers 230 and 231, are added by adder 232 and the result of the addition is binary coded by binary coding circuit 233 and is supplied to comparator 234. Comparator 234 takes the supplied binary coded signal as a reading reflection factor and compares the reading reflection factor with various reference values stored in memory circuit 235. That is, it outputs a signal for detecting whether the reading reflection factor is present in any area to determine the type of optical disk it is supplied from, to judgment unit 236. Then, judgment unit 236 outputs to CPU 237 a nature information corresponding to the supplied signal. That is, it outputs a signal showing the type of optical disk it is supplied from, for example, it outputs information showing the value of the oscillation output of semiconductor laser 214 during recording and reproducing for each type of optical disk.

The recording of information in the above state will now be described. It is assumed, for example, that CPU 237 outputs a control signal corresponding to the information showing the value of the oscillation output supplied from judgment unit 236 to reproducing light quantity setting unit 239. Reproducing light quantity setting unit 239 outputs the drive signal corresponding to the supplied control signal to the base of transistor 240. By this operation, transistor 240 amplifies the current at the amplification factor corresponding to the drive signal. As a result, a laser light beam of continuous weak luminous intensity is generated from semiconductor laser 214 at the level corresponding to the signal from judgment unit 236. That is, a laser light beam of the luminous intensity corresponding to recording layer 211a of optical disk 211 is generated. For example, laser beam power for writing 10 mW and laser beam power for reproducing 1 mW are outputted when nature information is K1 and laser beam power for writing 5 mW and laser beam power for reproducing 0.5 mW are outputted when nature information is K2.

Also, CPU 237 outputs the modulation signal corresponding to the recording data supplied from an external device (not shown in the drawing) to either of the recording light quantity setting units 238a and 238b in accordance with the information showing the value of the oscillation output supplied from judgement unit 236. Then, recording light quantity setting unit 238a outputs the signal corresponding to the modulation signal to FET 242a. By this operation, FET 242a is intermittently turned ON/OFF in accordance with the supplied control signal. Therefore, a higher current than that corresponding to the signal from judgment unit 236 flows intermittently in semiconductor laser 214 and an intermittent laser light beam of strong luminous intensity is generated from semiconductor laser 214. As a result, a laser light beam (recording light beam) of strong luminous intensity and a laser light beam (reproducing light beam) of weak luminous intensity are generated from semiconductor laser 214. That is, the laser light beam of the luminous intensity corresponding to recording layer 211a of optical disk 211 is generated at this time. This laser light beam is converted into a parallel light beam by collimating lens 215 and guided to polarized beam splitter 216. The light beam guided to polarized beam splitter 216 is reflected and then injected into objective lens 218 through quarter-wave plate 217 and focused on optical disk 211 by objective lens 218. As a result, pits are formed on the tracks of recording layer 211a on optical disk 211 by irradiating a laser light beam (recording light beam) during the recording of information.

Also, as described above, in operations other than recording, a low current is supplied to the semiconductor laser 214. As a result, in operations other than generating a recording light beam, a laser light beam (reproducing light beam) of weak luminous intensity is generated. This laser light beam is irradiated to optical disk 211 in the same manner as the recording light beam. The reflected light beam from optical disk 211 for the reproducing light beam is converted into a parallel light beam by objective lens 218 and guided to polarized beam splitter 216 through quarter-wave plate 217. At this time, the laser light beam guided to polarized beam splitter 216 passes through and returns through quarter-wave plate 217, and its plane of polarization is rotated 90° when compared with that of the reflected light beam by polarized beam splitter 216. By this operation, the laser light beam passes through without being reflected by polarized beam splitter 216. The laser light beam L, passed through polarized beam splitter 216, is irradiated on photodetector 220 through projection lens 219. Accordingly, the signals corresponding to the irradiated light from photosensing cells 220a and 220b are outputted as a reproducing signal. By this reproducing signal, focusing and tracking are performed.

Next, the reproducing of information will be described. CPU 237 outputs the control signal corresponding to the information showing the value of the oscillation output supplied from judgment unit 236 to reproducing light quantity setting unit 239. By this operation, a continuous laser light beam of weak luminous intensity is generated from semiconductor laser 214. As a result, the same operation as used for generating a reproducing light beam during the above-described recording is performed and focusing and tracking are performed by the outputs of photosensing cells 220a and 220b. The outputs of amplifiers 230 and 231 are used to read (reproduce) data by the output of binary coding circuit 233.

As described above, in this device, it is possible to detect the reflection factor of a reflected light by the recording layer of the disk, and output of the nature information of the disk, which corresponds to the detected reflection factor, and change the oscillation output of the semiconductor laser during recording or reproducing for each type of disk in accordance with this nature information.

In the above embodiment, a situation where the oscillation output of semiconductor laser 214 is changed in accordance with nature information was described. However, the invention is not limited to specific embodiments thereof. The invention can be executed regardless of the change of the amplification factor of a reproducing signal, the change of the servo-constant, and the difference of processing of reading signals, that is, a higher or lower reflection factor of the recording unit for the written signals. Any one of the values K1-Kn can be selected as the above amplification factor. For example, the gain is 10 times greater at K1 and 20 times greater at K2. Any one of the values K1-Kn can be selected for the servo-constant. The gain is 2 times greater at K1 and 3 times greater at K2.

Also, the reflection factor is obtained by using the detection signal of the photodetector in the optical head. However, this invention is not limited to these specific embodiments. The invention may be practiced by using other light sources, focusing lens, and photodetectors to detect the reflection factor.

Also, in the case of a transmission type optical disk, the nature may be detected by detecting the transmission factor.

Further, the present invention can be applied to various recording mediums other than an optical disk.

What is claimed is:

1. An optical memory recording device for recording information on an optical memory means, said optical memory means including a recording layer selected from a plurality of recording layers each of which is of a different type, said recording layer having a first area for recording information and a second area containing a data representative of a specified layer among said plurality of layers, said optical memory recording device comprising:

means for generating a light having a prescribed light quantity;

means for converging said light onto said recording layer;

means for detecting said light reflected from said second area of said recording layer, and for outputting a detection signal in accordance with said data representative of a specified layer; and means, adapted to receive said detection signal, for controlling said generating means to generate an optimum quantity of light for said first area of said recording layer in response to said detection signal.

2. The optical memory recording device according to claim 1, wherein said optical memory means includes an optical disk, and said second area is provided at the innermost periphery or the outermost periphery of said optical disk.

3. The optical memory recording device according to claim 1, wherein said controlling means includes means for storing nature information representative of the material used in forming said plurality of types of recording layers.

4. The optical memory recording device according to claim 3, wherein said nature information stored in said storing means is representative of the value of the output power of said generating means during a recording operation for said optical memory means.

5. An optical memory reproducing device for reproducing information from an optical memory means, said optical memory means including a recording layer selected from a plurality of recording layers each of which is a different type, said recording layer having a first area for reproducing information from the recorded portion therein and a second area containing a data representative of a specified layer among said plurality of recording layers, said optical memory reproducing device comprising:

means for generating a light have a prescribed light quantity;

means for converging said light onto said recording layer;

means for detecting said light reflected from said second area of said recording layer, and for outputting a detection signal in accordance with said data representative of a speciifed layer; and means, adapted to receive said detection signal, for controlling said generating means to generate an optimum quantity of light for said first area of said recording layer in response to said detection signal.

6. The optical memory reproducing device according to claim 5 wherein said optical memory means includes an optical disk, and said second area is provided at the innermost periphery or the outermost periphery of said optical disk.

7. The optical memory reproducing device according to claim 5 wherein said controlling means includes means for storing nature information representative of the material used in forming said plurality of types of recording layers.

8. The optical memory reproducing device according to claim 7 wherein said nature information stored in said storing means is representative of the value of the output power of said generating means during a reproducing operation for said optical memory means.

* * * * *

UNITED STATES PATENT AND TRADEMARK OFFICE
CERTIFICATE OF CORRECTION

PATENT NO.  : 4,755,980
DATED       : July 5, 1988
INVENTOR(S) : Tetsuo Saito

It is certified that error appears in the above-identified patent and that said Letters Patent is hereby corrected as shown below:

ON THE TITLE PAGE ITEM [75]:

Tetsuo Saito should be the sole inventor of this invention.

Signed and Sealed this

Thirty-first Day of January, 1989

Attest:

DONALD J. QUIGG

*Attesting Officer*

*Commissioner of Patents and Trademarks*